United States Patent
Eberlein

(10) Patent No.: US 10,491,700 B2
(45) Date of Patent: Nov. 26, 2019

(54) APPLICATION MANAGED SERVICE INSTANCES

(71) Applicant: SAP SE, Walldorf (DE)

(72) Inventor: Peter Eberlein, Malsch (DE)

(73) Assignee: SAP SE, Walldorf (DE)

( * ) Notice: Subject to any disclaimer, the term of this patent is extended or adjusted under 35 U.S.C. 154(b) by 246 days.

(21) Appl. No.: 15/356,190

(22) Filed: Nov. 18, 2016

(65) Prior Publication Data

US 2018/0146056 A1    May 24, 2018

(51) Int. Cl.
*G06F 9/54* (2006.01)
*H04L 29/08* (2006.01)

(52) U.S. Cl.
CPC ............ *H04L 67/2809* (2013.01); *G06F 9/54* (2013.01); *G06F 9/548* (2013.01); *H04L 67/16* (2013.01); *H04L 67/125* (2013.01)

(58) Field of Classification Search
None
See application file for complete search history.

(56) References Cited

U.S. PATENT DOCUMENTS

| | | | |
|---|---|---|---|
| 7,523,142 B2 | 4/2009 | Driesen et al. |
| 7,657,575 B2 | 2/2010 | Eberlein et al. |
| 7,720,992 B2 | 5/2010 | Brendle et al. |
| 7,734,648 B2 | 6/2010 | Eberlein |
| 7,739,387 B2 | 6/2010 | Eberlein et al. |
| 7,894,602 B2 | 2/2011 | Mueller et al. |
| 7,971,209 B2 | 6/2011 | Eberlein et al. |
| 8,126,919 B2 | 2/2012 | Eberlein |
| 8,200,634 B2 | 6/2012 | Driesen et al. |
| 8,225,303 B2 | 7/2012 | Wagner et al. |
| 8,250,135 B2 | 8/2012 | Driesen et al. |
| 8,291,038 B2 | 10/2012 | Driesen |
| 8,301,610 B2 | 10/2012 | Driesen et al. |
| 8,356,010 B2 | 1/2013 | Driesen |
| 8,375,130 B2 | 2/2013 | Eberlein et al. |
| 8,380,667 B2 | 2/2013 | Driesen |
| 8,392,573 B2 | 3/2013 | Lehr et al. |
| 8,402,086 B2 | 3/2013 | Driesen et al. |
| 8,407,297 B2 | 3/2013 | Schmidt-Karaca et al. |
| 8,434,060 B2 | 4/2013 | Driesen et al. |
| 8,467,817 B2 | 6/2013 | Said et al. |
| 8,479,187 B2 | 7/2013 | Driesen et al. |
| 8,560,876 B2 | 10/2013 | Driesen et al. |
| 8,566,784 B2 | 10/2013 | Driesen et al. |

(Continued)

OTHER PUBLICATIONS

Communication from EPO re European Search Report for related EP Application No. 1700176.7-1221 dated Apr. 3, 2018; 9 pages.

(Continued)

*Primary Examiner* — Brian Whipple
(74) *Attorney, Agent, or Firm* — Fish & Richardson P.C.

(57) ABSTRACT

Registering a Service Broker and an Instance Manager Broker with a Controller. Receiving a request at the Controller from a Deployer associated with an Application to bind a Service Instance of an Instance Manager to an Application. Forwarding the received request from the Controller to the Instance Manager Broker to instantiate the Service Instance of the Instance Manager. Forwarding credentials returned by the Instance Manager Broker from the instantiated Service Instance of the Instance Manager from the Controller to the Deployer.

20 Claims, 6 Drawing Sheets

Service Instance Management with a Service Broker

(56) References Cited

U.S. PATENT DOCUMENTS

| | | |
|---|---|---|
| 8,572,369 B2 | 10/2013 | Schmidt-Karaca et al. |
| 8,604,973 B2 | 12/2013 | Schmidt-Karaca et al. |
| 8,612,406 B1 | 12/2013 | Said et al. |
| 8,645,483 B2 | 2/2014 | Odenheimer et al. |
| 8,706,772 B2 | 4/2014 | Hartig et al. |
| 8,751,573 B2 | 6/2014 | Said et al. |
| 8,762,731 B2 | 6/2014 | Engler et al. |
| 8,762,929 B2 | 6/2014 | Driesen |
| 8,793,230 B2 | 7/2014 | Engelko et al. |
| 8,805,986 B2 | 8/2014 | Driesen et al. |
| 8,875,122 B2 | 10/2014 | Driesen et al. |
| 8,880,486 B2 | 11/2014 | Driesen et al. |
| 8,924,384 B2 | 12/2014 | Driesen et al. |
| 8,924,565 B2 | 12/2014 | Lehr et al. |
| 8,972,934 B2 | 3/2015 | Driesen et al. |
| 8,996,466 B2 | 3/2015 | Driesen |
| 9,003,356 B2 | 4/2015 | Driesen et al. |
| 9,009,105 B2 | 4/2015 | Hartig et al. |
| 9,026,502 B2 | 5/2015 | Driesen et al. |
| 9,026,857 B2 | 5/2015 | Becker et al. |
| 9,031,910 B2 | 5/2015 | Driesen |
| 9,032,406 B2 | 5/2015 | Eberlein |
| 9,069,832 B2 | 6/2015 | Becker et al. |
| 9,069,984 B2 | 6/2015 | Said et al. |
| 9,077,717 B2 | 7/2015 | Said et al. |
| 9,122,669 B2 | 9/2015 | Demant et al. |
| 9,137,130 B2 | 9/2015 | Driesen et al. |
| 9,182,979 B2 | 11/2015 | Odenheimer et al. |
| 9,183,540 B2 | 11/2015 | Eberlein et al. |
| 9,189,226 B2 | 11/2015 | Driesen et al. |
| 9,223,985 B2 | 12/2015 | Eberlein et al. |
| 9,229,707 B2 | 1/2016 | Borissov et al. |
| 9,256,840 B2 | 2/2016 | Said et al. |
| 9,262,763 B2 | 2/2016 | Peter et al. |
| 9,724,757 B2 | 8/2017 | Barrett |
| 2008/0120129 A1 | 5/2008 | Seubert et al. |
| 2011/0295645 A1* | 12/2011 | Barros ............... H04L 67/2838 705/7.26 |
| 2013/0325672 A1 | 12/2013 | Odenheimer et al. |
| 2013/0332424 A1 | 12/2013 | Nos et al. |
| 2014/0047319 A1 | 2/2014 | Eberlein |
| 2014/0101099 A1 | 4/2014 | Driesen et al. |
| 2014/0108440 A1 | 4/2014 | Nos |
| 2014/0164963 A1 | 6/2014 | Klemenz et al. |
| 2014/0325069 A1 | 10/2014 | Odenheimer et al. |
| 2014/0379677 A1 | 12/2014 | Driesen et al. |
| 2015/0006608 A1 | 1/2015 | Eberlein et al. |
| 2015/0100546 A1 | 4/2015 | Eberlein et al. |
| 2015/0178332 A1 | 6/2015 | Said et al. |
| 2016/0173475 A1 | 6/2016 | Srinivasan et al. |
| 2017/0025441 A1 | 1/2017 | Mori |
| 2017/0339121 A1* | 11/2017 | Eberlein ............... H04L 63/08 |

OTHER PUBLICATIONS

Plasil et al. "*An architectural view of distributed objects and components in CORBA, Java RMI and CON/DCOM*", Internet Citation, Jun. 1998, XP002326430; retrieved at URL: www.informatik.uni-trier.de/~ley/db/journals/stp/stp19.html [retrieved on Apr. 25, 2005].

Gamma E. et al. "*Design Patterns*", Design Patterns, XX, XX, Jan. 1, 1996, pp. 87-116, XP002165691.

U.S. Appl. No. 14/960,983, filed Dec. 7, 2015, Eberlein, et al.

U.S. Appl. No. 15/083,918, filed Mar. 29, 2016, Eberlein, et al.

U.S. Appl. No. 15/087,677, filed Mar. 31, 2016, Eberlein, et al.

\* cited by examiner

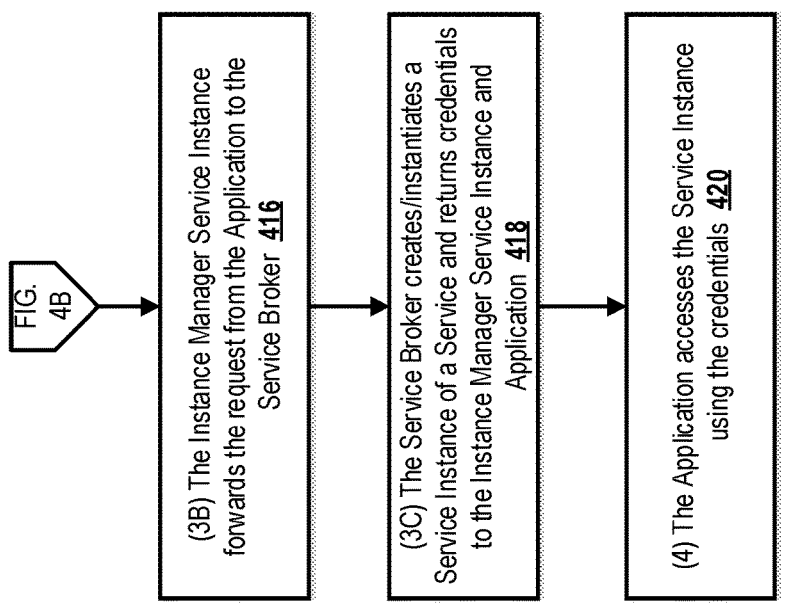

APPLICATION MANAGED SERVICE INSTANCES

BACKGROUND

Microservice-oriented application platforms (for example, XS ADVANCED or underlying CLOUD FOUNDARY PaaS) manage services as resources that are instantiated and bound at deployment time by an application operator. This is an appropriate model for applications that only require a fixed number of instances (typically one) of a particular type, such as a schema in a database. However, for multi-tenancy capable applications that leverage service instances for tenant separation (for example, each tenant stores its data in a separate schema), this static binding is not sufficient. Such applications need to create additional instances at runtime whenever a new tenant is added and they also need to connect to any one of these instances when processing a request for a specific tenant.

SUMMARY

The present disclosure describes methods and systems, including computer-implemented methods, computer program products, and computer systems for application service instance management with instance management functionality.

In an implementation, registering a Service Broker and an Instance Manager Broker with a Controller. Receiving a request at the Controller from a Deployer associated with an Application to bind a Service Instance of an Instance Manager to an Application. Forwarding the received request from the Controller to the Instance Manager Broker to instantiate the Service Instance of the Instance Manager. Forwarding credentials returned by the Instance Manager Broker from the instantiated Service Instance of the Instance Manager from the Controller to the Deployer.

The above-described implementation is implementable using a computer-implemented method; a non-transitory, computer-readable medium storing computer-readable instructions to perform the computer-implemented method; and a computer-implemented system comprising a computer memory interoperably coupled with a hardware processor configured to perform the computer-implemented method/the instructions stored on the non-transitory, computer-readable medium.

The subject matter described in this specification can be implemented in particular implementations so as to realize one or more of the following advantages. First, the described application-managed service instances concept leverages existing functionality and implementations for service instance creation and binding to provide dynamic service instance provisioning for multi-tenancy and other use cases. Existing Service Broker interfaces are leveraged to provide services through a REST API that applications can consume at runtime. Second, the concept is a fully compatible extension of existing interfaces. Third, the extensions significantly enhance service instance management for applications in a way that is both simple for applications to consume and simple to provide by reusing existing Service Broker implementations without modification (or without substantive modification) of the existing Service Broker implementations. Other advantages will be apparent to those of ordinary skill in the art. Other advantages will be apparent to those of ordinary skill in the art.

The details of one or more implementations of the subject matter of this specification are set forth in the accompanying drawings and the description below. Other features, aspects, and advantages of the subject matter will become apparent from the description, the drawings, and the claims.

DESCRIPTION OF DRAWINGS

FIGS. 4A-4B represent a flowchart illustrating an example method for application service instance management with an Instance Manager and Instance Manager Broker, according to an implementation.

Like reference numbers and designations in the various drawings indicate like elements.

DETAILED DESCRIPTION

Figure 1:
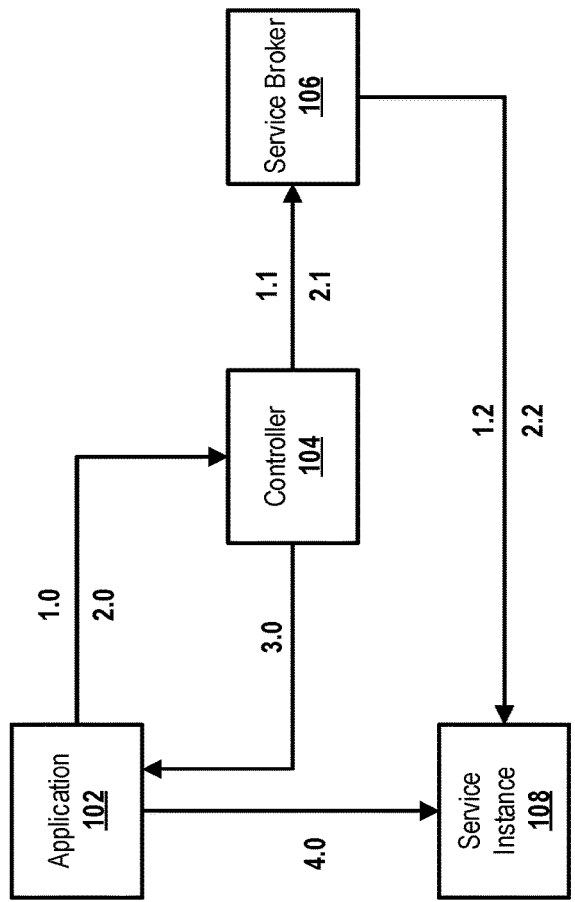
FIG. 1 is a block diagram illustrating current static component/data relationships for application service instance management with a Service Broker, according to an implementation.

The following detailed description describes functionality allowing applications to dynamically manage service instances and is presented to enable any person skilled in the art to make and use the disclosed subject matter in the context of one or more particular implementations. Various modifications to the disclosed implementations will be readily apparent to those of ordinary skill in the art, and described principles may be applied to other implementations and applications without departing from scope of the disclosure. Thus, the present disclosure is not intended to be limited to the described or illustrated implementations, but is to be accorded the widest scope consistent with the principles and features disclosed herein.

Because users expect a rich, interactive, and dynamic experience, an online or network-available, multi-tenancy-capable (MTC) software application (hereinafter, "Application") must be scalable, have minimal downtime, and be cloud-computing-environment enabled. Monolithic Applications cannot meet these requirements. However, in a microservices architecture (MSA), an Application is typically split into a number of individually-deployable, narrowly-focused, re-usable, fault-tolerant software services (hereinafter, "Services") (which can each also be broken down into additional supporting sub-Services) organized around capabilities (for example, a database persistence Service, email sending Service, job scheduling Service, user interface management Service, and other Services). Services can be implemented in various software/hardware environments, databases, programming languages, etc. as an interface is used to call particular Services. As a change to a small part of the Application requires only one or a small number of Services to be rebuilt and redeployed, a MSA is naturally modular and allows for a more continuous-delivery-type software development process.

A Service binding (for example, a set of key/value pairs containing a Service URL and access credentials) is normally used by a particular Application to make the Application aware of data/interface requirements needed to interact with each of the various Services. MSA Application platforms (for example, SAP HANA XS ADVANCED or underlying CLOUD FOUNDARY Platform-as-a-Service (PaaS)) manage Services as resources that are instantiated and bound at deployment time by a Deployer (for example, a third-party or application developer/administrator). This is an appropriate model for Applications that only require a fixed number of Service Instances (typically one) of a particular type, such as a schema in a database.

However, for Applications that leverage separation of instances of a Service (hereinafter, "Service Instances") for a tenant (hereinafter, "Tenant") (for example, each Tenant stores its data in a separate database schema), this type of static binding is not sufficient. Such Applications need to be able to create additional Service Instances dynamically at runtime whenever a new Tenant is added (or onboarded) to a cloud-computing-type environment and also need to connect to any one of these Service Instances when processing a request applicable to a specific Tenant. When a new Tenant subscribes to an Application, the Application is made aware by an onboarding process that the Tenant is new and the Application receives a chance to prepare provision of its services to the Tenant.

In order to provide for these requirements, an Instance Manager Broker and Instance Manager component is introduced. The Instance Manager exposes a representational state transfer (REST) application programming interface (API) that is accessible by an Application using a service binding to an Instance Manager instance to create actual Service Instances or to retrieve credentials to a specific Service Instance that the Instance Manager manages (for example, during onboarding, the Application can make a request to a Service Instance of the Instance Manager to dynamically create one or more Service Instances). The Instance Manager builds on functionality of a Service Broker that handles static instance creation and binding by providing Applications with an ability to also dynamically manage Service Instances.

In current implementations, at a high-level, before an Application is deployed, a Service Instance for an Application is created, typically by a Deployer. Here, a request is sent to a Controller to create an instance of a given Service associated with a given Service Plan (see below). The Controller forwards this request to a service-type-specific Service Broker that creates a new Service Instance as requested. Then, the Service Instance can be bound to the Application with another request (for example, sent by the Deployer) that is forwarded from the Controller to the Service Broker where appropriate credentials for accessing the Service Instance are created. These credentials are then provided to the Application (for example, in environment variables) when the Application is started so that the Application has the required information to access the Service Instance. With this approach the Application is statically bound to the Service Instance that it uses during Application runtime.

In order to allow Applications to create additional Service Instances dynamically at runtime whenever a new Tenant is onboarded and to connect to any one of these Service Instances when processing a request for a particular Tenant, the above-mentioned Instance Manager can be created by an Instance Manager Broker and bound to the Application in the same way as regular Service Instances are created and bound in the above-described current implementation. Note that creation and binding happens in the same way as current implementations from the perspective of a Service's Service Broker. However, from an Application's perspective there is a difference—the Application does not access credentials created during binding from its environment variables, but rather the Application receives these credentials dynamically as a result of a REST call to an Instance Manager. At a high-level, in this architecture and methodology, a request is sent to the Controller (for example, by a Deployer) to create a Service Instance of type Instance Manager. The request is forwarded to an Instance Manager Broker that creates a Service Instance of the Instance Manager.

The Instance Manager itself is considered a Service that exposes a REST API that can be accessed by the Application using a service binding to a particular Instance Manager instance to create actual Service Instances or to retrieve credentials to a specific Service Instance that the Instance Manager manages. As the Instance Manager provides this access directly through APIs that are called at runtime, the Application can dynamically bind to any Service Instance managed by the Instance Manager. The Application-Managed-Service-Instances concept leverages functionality provided by existing Service Brokers for Service Instance creation and binding to provide dynamic Service Instance provisioning for multi-tenancy and other use cases; leveraging existing Service Broker interfaces to provide services through a REST API that applications can consume at runtime.

One example of a high-level flow of actions for a multi-tenancy enabled application can be: When the Application is started, the Application receives credentials for an Instance Manager instance, not for an actual Service Instance. With these credentials, the Application invokes Services provided by the Instance Manager for creating new actual Service Instances whenever a new Tenant is added to the Application. When a Tenant uses the Application and access to an actual Service Instance is required, the Application invokes another Service of the Instance Manager that dynamically returns the credentials to the Tenant's actual Service Instance based, for example, on a Tenant identifier that can be provided when the Service Instance was originally created. With the returned credentials, the Application can then connect to actual Service Instances, dynamically switching between available Service Instances as required for processing requests for specific Tenants. In typical implementations, Service Instance credentials can be cached and open connections can be pooled to minimize overhead created by additional calls to the Instance Manager.

The Instance Manager is itself considered a managed service, but, to the actual Service Broker, the Instance Manager acts as an additional Controller (that is, the actual Service Broker needs to be registered at the Instance Manager so the Instance Manager can manage Services brokered by the actual Service Broker). For each Service and Service Plan that an actual Service Broker wishes to expose using the Instance Manager, the Instance Manager Broker creates a corresponding managed Service and managed Service Plan (for example, but not limited to, "prefixing the service name with "managed_"). For example, for an SAP HANA database Service Broker, there could be Services and Plans similar to those shown in Table 1:

TABLE 1

| Service | Plan | Managed Service | Managed Plan |
|---------|------|-----------------|--------------|
| hana | hdi-shared | managed_hana | hdi-shared |
| hana | sbss | | |

TABLE 1-continued

| Service | Plan | Managed Service | Managed Plan |
| --- | --- | --- | --- |
| hana | schema | managed_hana | schema |
| hana | securestore | managed_hana | securestore |

Note that in this example the sbss plan (statically bound) is not exposed through the Instance Manager as the Instance Manager is used for dynamic binding and there is no corresponding "managed" version of the "sbss" Service Plan. On the other hand, the "hdi-shared," "schema," and "securestore" Service Plans can be exposed through the Instance Manager.

Service Plans are defined by Service Brokers. When a Service Broker is registered with a Controller, the Controller calls a Service Broker API to retrieve a Service Catalog. The Service Catalog lists all Services and Service Plans that are provided by the Service Broker. Once the Service Broker has been registered, the Controller stores these Services and Service Plans so that the Controller can provide the list to consumers (for example, in the regular case to the Deployer, who can use a command line interface to get a listing of all Services and Service Plans of all Service Brokers; or in combination with an Instance Manager, the Instance Manager validates requests from Applications for specific Services and Service Plans to determine which Service Broker the requests should be forwarded to and if the requested Service Plan is supported).

In typical implementations, one Instance Manager can manage any number of Services and Service Plans provided by other Service Brokers. The Instance Manager uses a standard Service Broker API to acquire the above-mentioned Service catalog of Services and Service Plans when an additional Service Broker is registered with the Instance Manager. An additionally provided parameter to the Instance Manager can be used as a filter to make a list of Services and Service Plans available through the Instance Manager to not include Services and Service Plans that should not be made available through the Instance Manager (for example, the "sbss" Plan above in Table 1. The Instance Manager can also use Service Broker APIs to create, update, delete, etc. Service Instances and bindings when an Application invokes the Instance Manager APIs to request corresponding actions.

FIG. 1 is a block diagram illustrating component/data relationships 100 for current static Application Service Instance management with a Service Broker, according to an implementation. FIG. 1 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. In as far as they are consistent with this disclosure, these other possible orientations, arrangements, etc. are considered to be within the scope of this disclosure.

At a high-level and in current static implementations of Service Instance management, a generic middleman-type Controller 104 component is used to create an instance of a Service (for example, Service Instance 108) for an Application 102. The Controller 104 is used to call a Service Broker 106 component which creates and obtains binding credentials (for example, a Service binding as described above) for the requested Service Instance. The binding credentials are passed to the Controller 104 and used to bind the Application 102 to the Service Instance 108 using the binding credentials. Note that numbers associated with connecting arrows in FIG. 1 (for example, 1.0, 1.1, 1.2, etc.) are used in FIG. 2 for referential purposes to tie together the corresponding relationships between components).

Application 102 is a software application (for example, a MTC Application as described above) that implements execution logic and leverages a shared Service that lives outside of its own implementation. Although the Service is shared, each application has one (or more) isolated space(s) in the Service referred to as Service Instance(s) 108. A Service Instance 108 is a space within a shared Service provided to an Application 102. In the example of a database Service, the Service can be considered the database system and the Service Instance 108 can be considered a database schema in that database system.

Service Broker 106 manages (or brokers) the Service Instances of a shared Service. There is a Service Broker 106 associated with each Service type, but each Service Broker can manage multiple Service types. The Service Broker 106 is configured to create an instance of a specific Service and is able to provide connection parameters and credentials to Applications 102 that need to access a Service Instance 108.

Controller 104 is the middleman between Applications 108 and Service Brokers 106. The Controller 104 is aware of all Service Brokers 106 available in a system and mediates requests from Applications 102 requesting Service Instances 108 of a specific type to the appropriate Service Broker 106. In some implementations, the Controller 104 can also cache connection parameters and credentials provided by a Service Broker 106 so that repeated binding requests from an Application 102 to the same Service Instance 108 can be processed without a need to repeatedly query the Service Broker 106.

Figure 2:
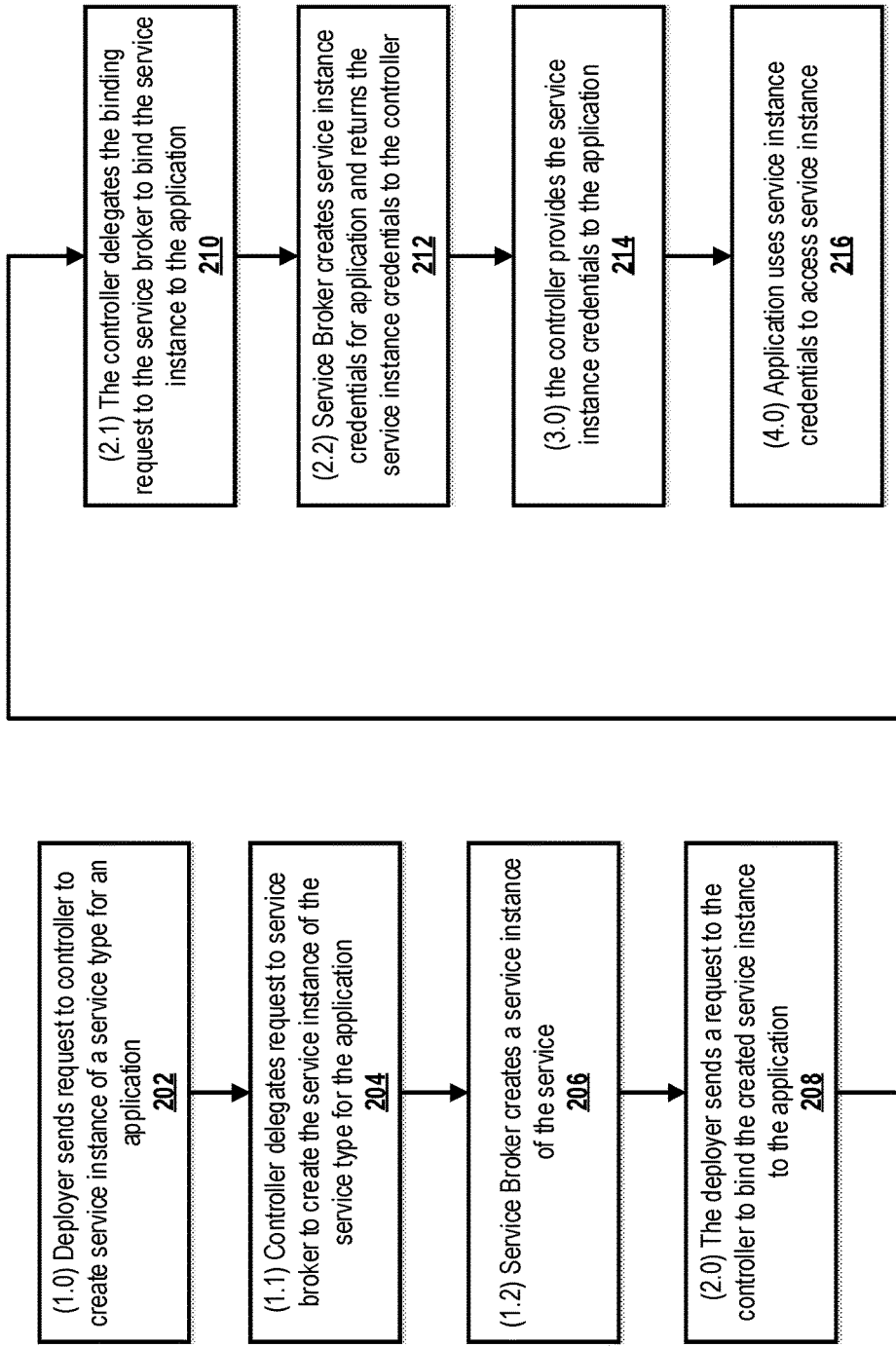
FIG. 2 is a flowchart of an example method for current static application service instance management with a Service Broker, according to an implementation.

FIG. 2 is a flowchart of an example method 200 for current static Application Service Instance management with a Service Broker, according to an implementation. For clarity of presentation, the description that follows generally describes method 200 in the context of the other figures in this description. However, it will be understood that method 200 may be performed, for example, by any suitable system, environment, software, and hardware, or a combination of systems, environments, software, and hardware as appropriate. In some implementations, various steps of method 200 can be run in parallel, in combination, in loops, or in any order.

At 202, (1.0) before an Application is deployed, a Service Instance 108 of a Service is created and bound to the Application 102 by a request sent by a Deployer (not illustrated) to a Controller 104 to create Service Instance 108 of a Service type for the Application 102. For example, each Application 102 can have a Service Plan (not illustrated)—data that describes what services each Application should/are allowed to use. Service Plans are typically stored in an accessible location by the Service Broker 106. The Controller 104 can query the Service Broker 106 for a list of available Service Plans available to the particular Application 102.

In the static case example of FIGS. 1 & 2, a Deployer (not illustrated) and not an Application 102 itself creates and binds the Service Instance 108 to the Application 102. In typical implementations, a Service Plan that an Application requests is stored in a deployment descriptor file that is included with the Application and used by the Deployer to create the correct instance. The Deployer can read an Application-defined Service Plan that is requested and tell the Controller 104 what Service(s) 108 that the Application 102 wishes to use for various functions. Logically, this is done on behalf of the Application 102 (in this and corresponding steps of method 200). For reasons of simplicity, in the provided example of FIGS. 1 & 2, a corresponding arrow (1.0) for the request sent to the Controller 104 is illustrated as starting at the Application 102. Technically these steps are not typically implemented inside of the Application 102 itself.

Each Application 102 can receive information related to a Service Instance 108. For example, in the case of a database, five different Applications 102 can use the same database, but there would be five separate Service Instances 108 created (in the database context, each Application 102 would receive their own schema as to not interfere with each other). From 202, method 200 proceeds to 204.

At 204, (1.1) the Controller 104 delegates the Deployer service request to a Service Broker 106 to create the Service Instance 108 of the Service type for the Application 102. Here, the Controller 104 calls the Service Broker 106 (typically each Service type has its own Service Broker 106). At a lower-level, the Controller 104 calls an interface (not illustrated) for a particular Service Broker 106 as the Controller 104 is configured with knowledge of the type of Service that is needed. Data describing particulars of the interface called can be swapped depending upon the type of Service needed. For example, if it is desired to switch database types, version, etc., a data structure describing the database that the Controller 104 should use to initiate generation of a database Service can be modified and the Controller 104 will call the updated interface information of an appropriate Service Broker 106. From 204, method 200 proceeds to 206.

At 206, (1.2) the Service Broker 106 creates (or initiates creation of) a Service Instance 108 of the Service type (for example, a Service to create a database schema). Binding credentials are obtained by the Service Broker 106. From 206, method 200 proceeds to 208.

At 208, (2.0) the Deployer sends a request to the Controller 104 to bind the created Service Instance 108 to the Application 102. From 208, method 200 proceeds to 210.

At 210, (2.1) the Controller 104 delegates the binding request to the Service Broker 106 to bind the Service Instance 108 to the Application 102. From 210, method 200 proceeds to 212.

At 212, (2.2) the Service Broker 106 creates Service Instance credentials (not illustrated) for the Application 102 (for example, create a database user with access to an associated database schema) and returns the Service Instance credentials to the Controller 104. From 212, method 200 proceeds to 214.

At 214, (3.0) the Controller 104 provides the Service Instance credentials to the Application 102 to bind the Service Instance 108 to the Application 102. For example, in one implementation, the Controller 104 can inject parameters/credentials into the environment variables of the Application 102 to effect the binding. From 214, method 200 proceeds to 216.

At 216, (4.0) the Application 102 is started and can use the Service Instance credentials to access the bound Service Instance 108. With this approach, the Application 102 is statically bound to the particular Service Instance 108 that can be used during the runtime of Application 102. In this example, if the particular Service Instance 108 crashes or is rendered somehow unreachable by the Application 102, the Application 102 has no ability to use a different Service Instance 108 as it is tied to the one that failed. From 216, method 200 stops.

Enhanced Functionality Through an Instance Manager/Instance Manager Broker

In the case of an application (for example, Application 102) that can be used by more than one customer in a cloud-computing-type environment, the implementation described with respect to FIGS. 1 & 2 is insufficient. When a user (for example, a Tenant) logs into the Application 102 in a cloud-computing-type environment, the user is associated with a Tenant identifier (for example, a digitally signed ticket associated with the Tenant) and used by the Application 102 to access and retrieve data for the Tenant. While it is possible in some implementations to configure, for example, a database to identify tables as associated with a particular customer/Tenant (for example, using a value in each query that is uniquely associated the particular customer/Tenant when operating on database tables of a database schema), extensibility, customization, etc. are impacted as changes needed for one Tenant end up impacting all Tenants (for example, a Tenant wants to extend a database table by adding a field—this action increases the size of a database, can impact database performance, etc.). In a multi-tenancy environment, what is needed is for the same Application 102 to be able to dynamically use multiple/different Service Instances (for example, database schemas), each appropriate for a different Tenant without the Application 102 needing to be deployed multiple times (that is, each particular Application 102 deployment for a particular Tenant). Instead of directly binding an Application 102 to a Service Instance 108, an indirection is performed to bind the Application to an Instance Manager which offers APIs to particular Service Instances 108 (for example, database schemas). The Application 102 can call the Instance Manager to dynamically gain access to Service Instances 108.

Figure 3:
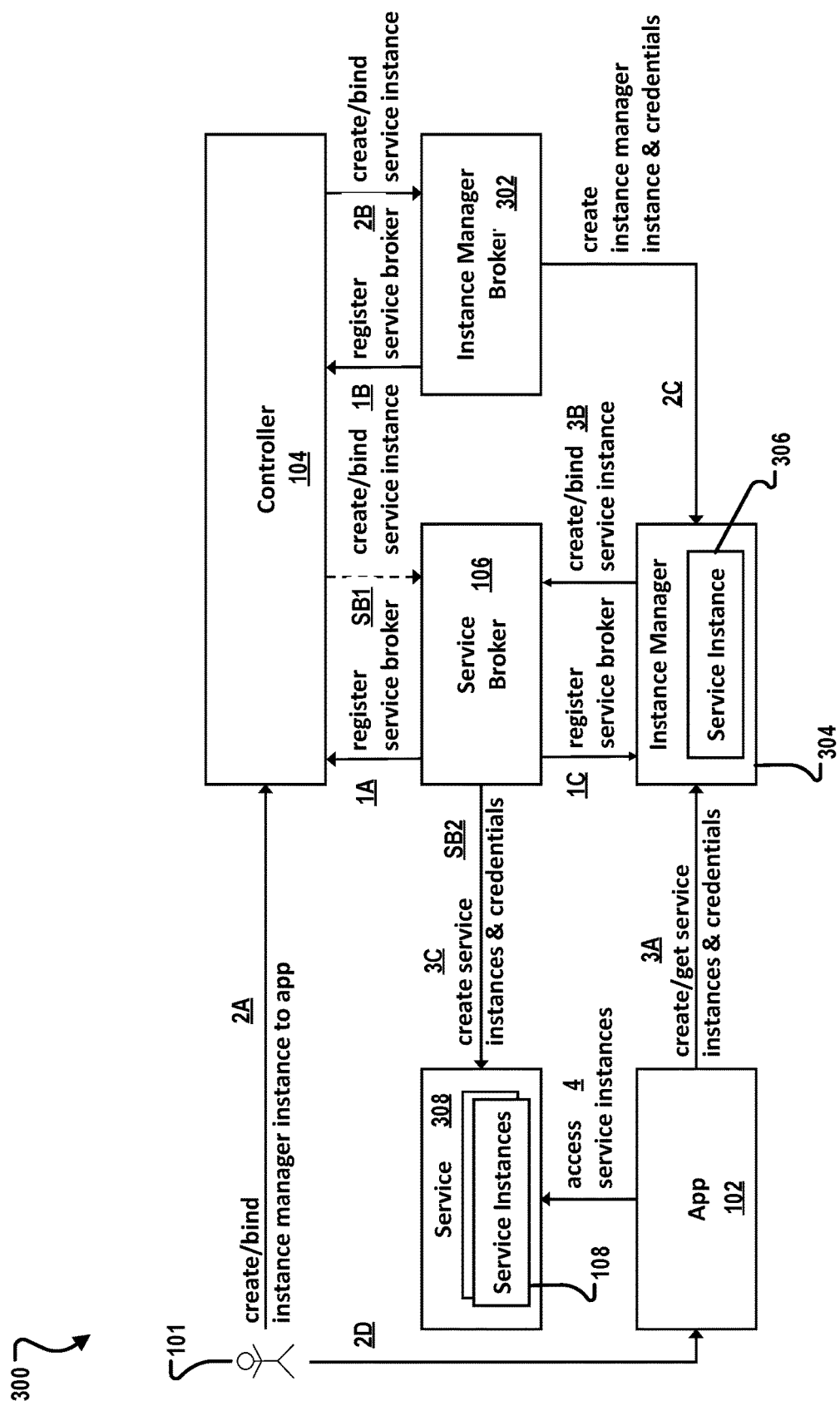
FIG. 3 is a block diagram illustrating component/data relationships for application service instance management with an Instance Manager Broker and Instance Manager, according to an implementation.

FIG. 3 is a block diagram 300 illustrating component/data relationships for application service instance management with an Instance Manager Broker and Instance Manager, according to an implementation. Note that FIG. 1 is provided for example purposes only to enhance understanding of the presented concepts. As will be appreciated for those of ordinary skill in the art, there are a myriad of other ways to present or arrange the presented components, structure their interactions, describe inter/intra-component interactions/communications, etc. in as far as they are consistent with this disclosure, these other possible orientations, arrangements, etc. are considered to be within the scope of this disclosure.

To enhance the functionality of FIGS. 1 & 2, Service Broker 106 functionality is extended, without modification (or substantive modification) of the Service Broker 106 by introducing an Instance Manager Broker 302 and Instance Manager 304 component for application managed service instances. Instead of creating and binding an actual service instance to the Application 102, a Service Instance 306 of an Instance Manager 304 can be created by a call to an Instance Manager Broker 302. The Service Instance 306 can be bound to the Application 102 in the same way as regular Service Instances (for example, Service Instances 108 of FIGS. 1 & 2) are created and bound. Note that functionality described above with respect to FIGS. 1 & 2 can also be available to components of FIGS. 3 & 4A-4C (for example, the Controller 104 can access Service Plans stored by the Service Broker 106 similar to the description above with respect to Controller 104 and Service Broker 106). In some implementations, corresponding components between FIGS. 1 and 3 can share some or all of the same functionality.

At a high-level, both a Service Broker 106 and an Instance Manager Broker 302 are registered with a Controller 104. After the registrations, the Controller 104 offers to a developer Services from the two different brokers for use by an Application 102 (the developer can instantiate Services using either the Service Broker 106 or the Instance Manager Broker 302).

The Service Broker 106 is also registered with the Instance Manager 304. Here, the Service Broker 106 is technically registered to another Controller (here Instance Manager 304). This also means that if another particular Service 308 needs to be made available/managed, a Service Broker 106 associated with that particular Service 308 would simply register itself with the Instance Manager 304. As a result, the Instance Manager 304 is aware of available Services 308 and Service Instances 108.

The Service Broker 106 provides access to a Service Instance 108 of a Service 308 and the Instance Manager Broker 302 provides access to a Service Instance 306 of an Instance Manager 304. Note that the Instance Manager 304 acts both as a Service from the point-of-view of the Controller 104 but as a different Controller component from the point-of-view of the Service Broker 106. Service 308 is an example service to be brokered and is brokered through the Service Broker 106 while the Instance Manager 304 (as a Service) is brokered through the Instance Manager Broker 302. A developer can use the Service Broker 106 to bind a Service Instance 108 of Service 308 statically to an Application 102 (for example and as described above, following SB1 from Controller 104 to Service Broker 106 and SB2 from Service Broker 106 to Service 308 to return credentials for a created Service Instance 108 which is statically bound to Application 102), while the Instance Manager Broker 302 can be used to bind a Service Instance 306 of the Instance Manager 304 to an Application 102 to allow dynamic allocation of Service Instances 108 of Service 308 to Application 102.

A Deployer 101 requests a static binding of a Service Instance 306 of the Instance Manager 304 to the Application 102 by sending a request to the Controller 104. Controller 104 forwards the request to the Instance Manager Broker 302. The Instance Manager Broker 302 creates/instantiates the Service Instance 306 of the Instance Manager 304 and returns credentials of the Service Instance 306 to the Deployer 101. Deployer 101 passes the credentials received from the Controller 104/Instance Manager Broker 302 to Application 102. The credentials are used to bind the Service Instance 306 to the Application 102.

When the Application 102 starts, the Application 102 can use the statically bound Service Instance 306 of the Instance Manager 304 to request a Service Instance 108 of a Service 308. The Application 102 requests that the Service Instance 306 of the Instance Manager 304 create a service instance 108. This is an example of a dynamic REST call from the Application 102 when, for example, a new Tenant is onboarded. The Service Instance 306 forwards the request to the Service Broker 106. The Service Broker 106 creates/instantiates a Service Instance 108 of a Service 308 and returns credentials (for example, for a database the credentials could include a database schema, technical user of the database, password to the database, etc.) of the Service Instance 108 to the Instance Manager Service Instance 306 (here acting as a calling Controller) which returns the credentials to the Application 102. Application 102 accesses the service instance 108 using the received credentials.

Figure 4A:
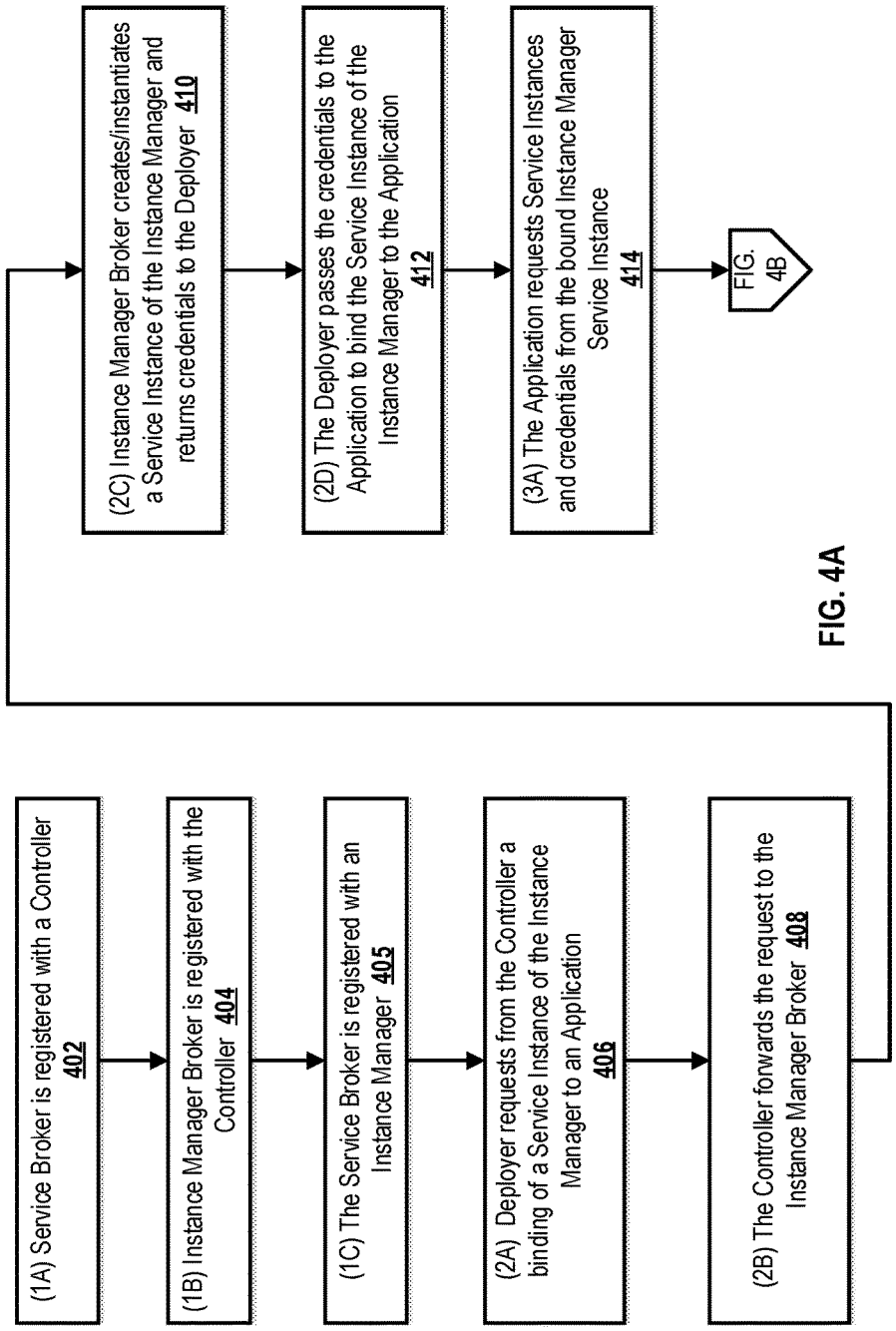

FIGS. 4A-4B represent a flowchart illustrating an example method 400 (as 400a-400b) for application Service Instance management with an instance manager, according to an implementation. For clarity of presentation, the description that follows generally describes method 400 in the context of the other figures in this description. However, it will be understood that method 400 may be performed, for example, by any suitable system, environment, software, and hardware, or a combination of systems, environments, software, and hardware as appropriate. In some implementations, various steps of method 400 can be run in parallel, in combination, in loops, or in any order.

At 402 (1A), a Service Broker 106 is registered with the Controller 104. From 402, method 400 proceeds to 404.

At 404 (1B), an Instance Manager Broker 302 is registered with the Controller 104. After the registrations at 402 and 404, the Controller 104 can offer Services from the two different brokers for use by an Application 102. From 404, method 400 proceeds to 405.

At 405 (1C), the Service Broker 106 is registered with the Instance Manager 304. Here, the Service Broker is technically registered to another Controller (here Instance Manager 304). This also means that if another particular Service 308 needs to be made available/managed, a Service Broker 106 associated with that particular Service 308 would simply register itself with the Instance Manager 304. As a result, the Instance Manager 304 is aware of available Services 308 and Service Instances 108. From 405, method 400 proceeds to 406.

At 406 (2A), Deployer 101 requests a binding of a Service Instance 306 of the Instance Manager 304 to the Application 102 by sending a request to the Controller 104. From 406, method 400 proceeds to 408.

At 408 (2B), Controller 104 forwards the request to the Instance Manager Broker 302. From 408, method 400 proceeds to 410.

At 410 (2C), the Instance Manager Broker 302 creates/instantiates the Service Instance 306 of the Instance Manager 304 and returns credentials of the Service Instance 306 to the Deployer 101. From 410, method 400 proceeds to 412.

At 412 (2D), the Deployer 101 passes the received credentials from Controller 104/Instance Manager Broker 302 to Application 102. The credentials are used to bind the instantiated Service Instance 306 to the Application 102. From 412, method 410 proceeds to 414.

At 414 (3A), on starting, the Application 102 requests that the Service Instance 306 create a service instance 108. From 414, method 400 proceeds to 416 in FIG. 4B.

At 416 (3B), the Service Instance 306 forwards the request from Application 102 to the Service Broker 106. From 416, method 400 proceeds to 418.

At 418 (3C), the Service Broker 106 creates/instantiates a Service Instance 108 of a Service 308 and returns credentials (for example, for a database the credentials could include a database schema, technical user of the database, password to the database, etc.) of the Service Instance 108 to the Instance Manager Service Instance 306 (here a calling Controller) which returns the credentials to the Application 102. From 418, method 400 proceeds to 420.

At 420 (4), the Application 102 accesses the Service Instance 108 using the received credentials. After 420, method 400 stops.

If a requested Service Instance 108 is not running when requested using valid credentials, a system component (not illustrated) can be used to start the Service Instance 108 appropriately. If a Tenant completes using the Service Instance 108, the Service Instance 108 can disconnect from the Application 102 and be reconnected following a subsequent request by the Application 102 (for example, the Tenant logs on to the Application 102 and service instance is again needed). Typically the Instance Manager 304 keeps a record of the available Service Instance 108 credentials for all registered Service Brokers 106 (the Instance Manager Service Instance 306 calls the Service Broker 106 when a new Service Instance of a Service 308 needs to be created/deleted—such as, create binding or delete binding). In this way, the Instance Manager Service Instance 306 can pass the information to the Application 102 without need to always contact the Service Broker(s) 106. After 420, method 400 stops.

Note that if a Service Instance 108 fails, the Application 102 can dynamically request that a new Service Instance 108 be created for use. The Instance Manager Service Instance 306 can reply to request a list of credentials from the Application 102 of Service Instances 108 that it manages (as the Controller 104 can respond to a similar request for static Service Instances 108 that it manages).

With respect to the discussion of Service Plans above, a Deployer 101 can choose which type of Service Plan desired for a particular service. The Deployer 101 can use a service catalog (as an example, refer to Table 1 above) detailing available Service Plans (for example, static, managed, etc.) for each service. The particular Service Plan can be sent as a parameter at 2A above in FIG. 3. When the Controller 104 receives the create request, the Controller 104 will forward the Service Plan parameter to the appropriate broker (either the Service Broker 106 or Instance Manager Broker 302) based on knowledge of the service catalog. In the case of "managed" Service Plan, the Controller 104 will forward the request to the Instance Manager Broker 302 and the request will be forwarded to the Instance Manager were an instance of the appropriate Service Instance 306 will be instantiated. The Deployer 101 will pass the Service Plan parameter to the Application 102. The Application 102 requests a Service Instance 108 from the Instance Manager Service Instance 304. Note that the Instance Manager Service Instance 304 will use the Service Plan that was requested by the Deployer 101 when the Instance Manager Service Instance 306 was created. The Instance Manager Service Instance 306 will pass the Service Plan parameter to the Service Broker 106 to instantiate the appropriate Service Instance 108 for the requested Service Plan. The Instance Manager Service Instance 306 stores the Service Plan as it was requested when Instance Manager Service Instance 306 was created. This allows the Instance Manager Service Instance 306 to inject this information later on when the Application 102 calls that Instance Manager Service Instance 306 requesting a new Service Instance 108. As written above, at this point the Application 102 can no longer change its mind and pass another Service Plan as that is already fixed with the Instance Manager Service Instance 306.

Figure 5:
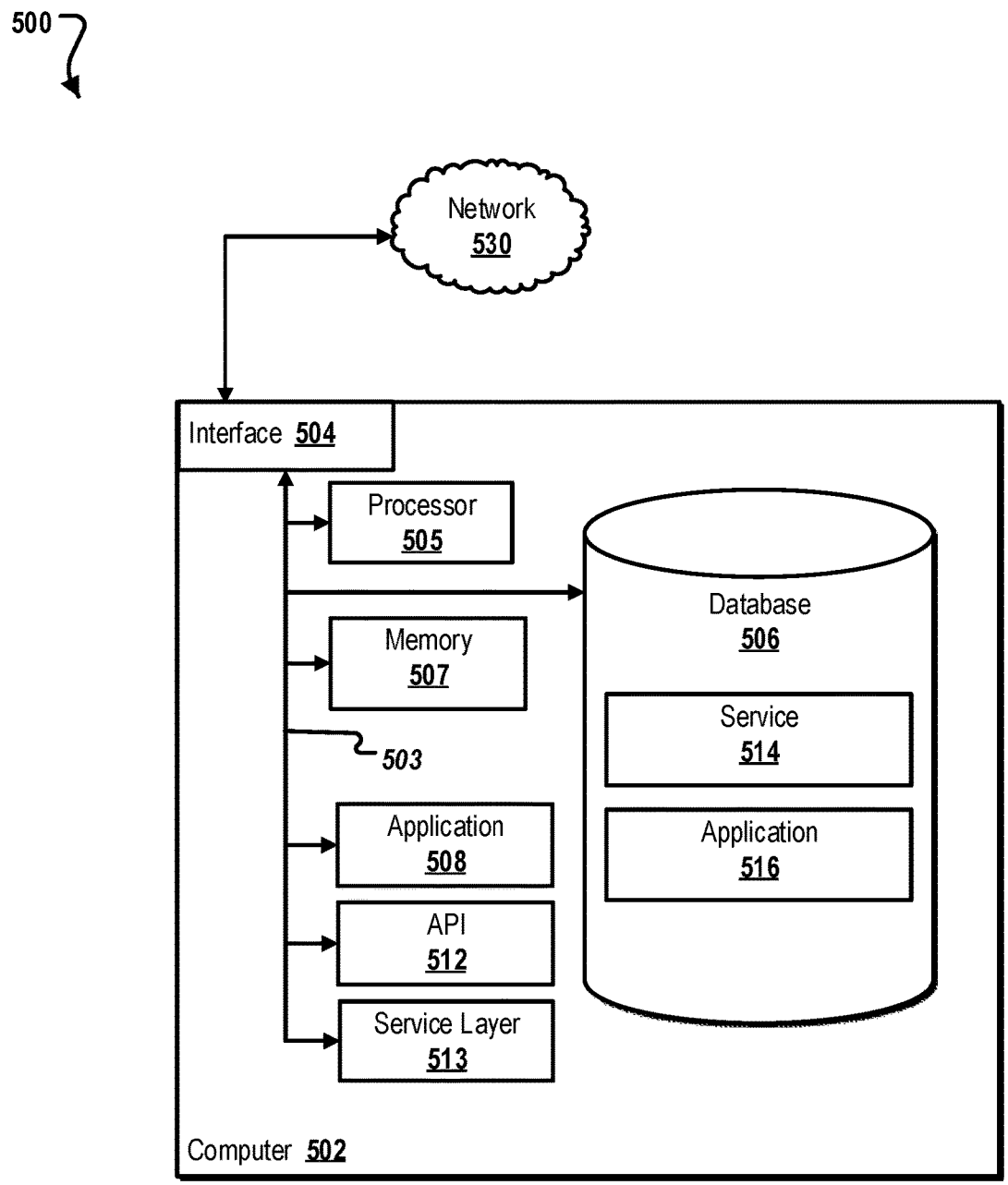
FIG. 5 is a block diagram illustrating an exemplary computer system used to provide computational functionalities associated with described algorithms, methods, functions, processes, flows, and procedures as described in the instant disclosure, according to an implementation.

FIG. 5 is a block diagram of an exemplary computer system 500 used to provide computational functionalities associated with described algorithms, methods, functions, processes, flows, and procedures as described in the instant disclosure, according to an implementation. The illustrated computer 502 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may comprise a computer that includes an input device, such as a keypad, keyboard, touch screen, or other device that can accept user information, and an output device that conveys information associated with the operation of the computer 502, including digital data, visual, or audio information (or a combination of information), or a graphical user interface (GUI).

The computer 502 can serve in a role as a client, network component, a server, a database or other persistency, or any other component (or a combination of roles) of a computer system for performing the subject matter described in the instant disclosure. The illustrated computer 502 is communicably coupled with a network 530. In some implementations, one or more components of the computer 502 may be configured to operate within environments, including cloud-computing-based, local, global, or other environment (or a combination of environments).

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, or other server (or a combination of servers).

The computer 502 can receive requests over network 530 from a client application (for example, executing on another computer 502) and responding to the received requests by processing the said requests in an appropriate software application. In addition, requests may also be sent to the computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or the interface 504 (or a combination of both) over the system bus 503 using an application programming interface (API) 512 or a service layer 513 (or a combination of the API 512 and service layer 513). The API 512 may include specifications for routines, data structures, and object classes. The API 512 may be either computer-language independent or dependent and refer to a complete interface, a single function, or even a set of APIs. The service layer 513 provides software services to the computer 502 or other components (whether or not illustrated) that are communicably coupled to the computer 502. The functionality of the computer 502 may be accessible for all service consumers using this service layer. Software services, such as those provided by the service layer 513, provide reusable, defined functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single interface 504 in FIG. 5, two or more interfaces 504 may be used according to particular needs, desires, or particular implementations of the computer 502. The interface 504 is used by the computer 502 for communicating with other systems in a distributed environment that are connected to the network 530 (whether illustrated or not). Generally, the interface 504 comprises logic encoded in software or hardware (or a combination of software and hardware) and operable to communicate with the network 530. More specifically, the interface 504 may comprise software supporting one or more communication protocols associated with communications such that the network 530 or interface's hardware is operable to communicate physical signals within and outside of the illustrated computer 502.

The computer 502 includes a processor 505. Although illustrated as a single processor 505 in FIG. 5, two or more processors may be used according to particular needs, desires, or particular implementations of the computer 502. Generally, the processor 505 executes instructions and manipulates data to perform the operations of the computer 502 and any algorithms, methods, functions, processes, flows, and procedures as described in the instant disclosure.

The computer 502 also includes a database 506 that can hold data for the computer 502 or other components (or a combination of both) that can be connected to the network 530 (whether illustrated or not). For example, database 506 can be an in-memory, conventional, or other type of database storing data consistent with this disclosure. In some implementations, database 506 can be a combination of two or more different database types (for example, a hybrid in-memory and conventional database) according to particular needs, desires, or particular implementations of the computer 502 and the described functionality. Although illustrated as a single database 506 in FIG. 5, two or more databases (of the same or combination of types) can be used according to particular needs, desires, or particular implementations of the computer 502 and the described functionality. While database 506 is illustrated as an integral component of the computer 502, in alternative implementations, database 506 can be external to the computer 502. As illustrated, the database 506 can hold Services 514 and Applications 516 (and particular instances of Services 514 and Applications 516) as described above. Memory 507 can also hold Services 514 and Applications 516 (and particular instances of Services 514 and Applications 516) as described above.

The computer 502 also includes a memory 507 that can hold data for the computer 502 or other components (or a combination of both) that can be connected to the network 530 (whether illustrated or not). For example, memory 507 can be random access memory (RAM), read-only memory (ROM), optical, magnetic, and the like storing data consistent with this disclosure. In some implementations, memory 507 can be a combination of two or more different types of memory (for example, a combination of RAM and magnetic storage) according to particular needs, desires, or particular implementations of the computer 502 and the described functionality. Although illustrated as a single memory 507 in FIG. 5, two or more memories 507 (of the same or combination of types) can be used according to particular needs, desires, or particular implementations of the computer 502 and the described functionality. While memory 507 is illustrated as an integral component of the computer 502, in alternative implementations, memory 507 can be external to the computer 502.

The application 508 is an algorithmic software engine providing functionality according to particular needs, desires, or particular implementations of the computer 502, particularly with respect to functionality described in this disclosure. For example, application 508 can serve as one or more components, modules, applications, etc. Further, although illustrated as a single application 508, the application 508 may be implemented as multiple applications 507 on the computer 502. In addition, although illustrated as integral to the computer 502, in alternative implementations, the application 508 can be external to the computer 502.

There may be any number of computers 502 associated with, or external to, a computer system containing computer 502, each computer 502 communicating over network 530. Further, the term "client," "user," and other appropriate terminology may be used interchangeably as appropriate without departing from the scope of this disclosure. Moreover, this disclosure contemplates that many users may use one computer 502, or that one user may use multiple computers 502.

Described implementations of the subject matter can include one or more features, alone or in combination.

For example, in a first implementation, a computer-implemented method, comprising: registering a Service Broker; registering an Instance Manager Broker; receiving a request from a Deployer associated with an Application to bind a Service Instance of an Instance Manager to an Application; forwarding the received request to the Instance Manager Broker to instantiate the Service Instance of the Instance Manager; and forwarding credentials returned by the Instance Manager Broker from the instantiated Service Instance of the Instance Manager to the Deployer.

The foregoing and other described implementations can each optionally include one or more of the following features:

A first feature, combinable with any of the following features, comprising registering the Service Broker with an Instance Manager.

A second feature, combinable with any of the previous or following features, comprising: instantiating the Service Instance of the Instance Manager with the Instance Manager Broker; returning credentials associated with the Service Instance of the Instance Manager to the Instance Manager Broker; and returning credentials from the Instance Manager Broker to the Deployer.

A third feature, combinable with any of the previous or following features, comprising passing the returned credentials from the Deployer to the Application to bind the Application to the Service Instance of the Instance Manager.

A fourth feature, combinable with any of the previous or following features, comprising the Application requesting Service Instances of available Services and credentials associated with the Service Instances of the available Services from the Service Instance of the Instance Manager.

A fifth feature, combinable with any of the previous or following features, comprising: sending a request from the Application to the Service Instance of the Instance Manager to instantiate a particular Service Instance of a Service; and forwarding the request from the Application from the Service Instance of the Instance Manager to the Service Broker.

A sixth feature, combinable with any of the previous or following features, comprising: instantiating the particular Service Instance of the Service with the Service Broker; and accessing the instantiated Service Instance of the Service with the Application using the credentials associated with the Service Instances of the available Services.

In a second implementation, a non-transitory, computer-readable medium storing one or more instructions executable by a computer system to perform operations comprising: registering a Service Broker; registering an Instance Manager Broker; receiving a request from a Deployer associated with an Application to bind a Service Instance of an Instance Manager to an Application; forwarding the received request to the Instance Manager Broker to instantiate the Service Instance of the Instance Manager; and forwarding credentials returned by the Instance Manager Broker from the instantiated Service Instance of the Instance Manager to the Deployer.

The foregoing and other described implementations can each optionally include one or more of the following features:

A first feature, combinable with any of the following features, comprising one or more instructions to register the Service Broker with an Instance Manager.

A second feature, combinable with any of the previous or following features, comprising one or more instructions to: instantiate the Service Instance of the Instance Manager with the Instance Manager Broker; return credentials associated with the Service Instance of the Instance Manager to the Instance Manager Broker; and return credentials from the Instance Manager Broker to the Deployer.

A third feature, combinable with any of the previous or following features, comprising one or more instructions to pass the returned credentials from the Deployer to the Application to bind the Application to the Service Instance of the Instance Manager.

A fourth feature, combinable with any of the previous or following features, comprising one or more instructions to request, by the Application, Service Instances of available Services and credentials associated with the Service Instances of the available Services from the Service Instance of the Instance Manager.

A fifth feature, combinable with any of the previous or following features, comprising one or more instructions to: send a request from the Application to the Service Instance of the Instance Manager to instantiate a particular Service Instance of a Service; and forward the request from the Application from the Service Instance of the Instance Manager to the Service Broker.

A sixth feature, combinable with any of the previous or following features, comprising one or more instructions to: instantiate the particular Service Instance of the Service with the Service Broker; and access the instantiated Service Instance of the Service with the Application using the credentials associated with the Service Instances of the available Services.

In a third implementation, a computer-implemented system, comprising: a computer memory; and a hardware processor interoperably coupled with the computer memory and configured to perform operations comprising: registering a Service Broker; registering an Instance Manager Broker; receiving a request from a Deployer associated with an Application to bind a Service Instance of an Instance Manager to an Application; forwarding the received request to the Instance Manager Broker to instantiate the Service Instance of the Instance Manager; and forwarding credentials returned by the Instance Manager Broker from the instantiated Service Instance of the Instance Manager to the Deployer.

The foregoing and other described implementations can each optionally include one or more of the following features:

A first feature, combinable with any of the following features, further configured to register the Service Broker with an Instance Manager.

A second feature, combinable with any of the previous or following features, further configured to: instantiate the Service Instance of the Instance Manager with the Instance Manager Broker; return credentials associated with the Service Instance of the Instance Manager to the Instance Manager Broker; and return credentials from the Instance Manager Broker to the Deployer.

A third feature, combinable with any of the previous or following features, further configured to pass the returned credentials from the Deployer to the Application to bind the Application to the Service Instance of the Instance Manager.

A fourth feature, combinable with any of the previous or following features, further configured to request, by the Application, Service Instances of available Services and credentials associated with the Service Instances of the available Services from the Service Instance of the Instance Manager.

A fifth feature, combinable with any of the previous or following features, further configured to: send a request from the Application to the Service Instance of the Instance Manager to instantiate a particular Service Instance of a Service; and forward the request from the Application from the Service Instance of the Instance Manager to the Service Broker.

A sixth feature, combinable with any of the previous or following features, further configured to: instantiate the particular Service Instance of the Service with the Service Broker; and access the instantiated Service Instance of the Service with the Application using the credentials associated with the Service Instances of the available Services.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, that is, one or more modules of computer program instructions encoded on a tangible, non-transitory, computer-readable computer-storage medium for execution by, or to control the operation of, data processing apparatus. Alternatively, or in addition, the program instructions can be encoded on an artificially generated propagated signal, for example, a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The term "real-time," "real time," "realtime," "real (fast) time (RFT)," "near(ly) real-time (NRT)," "quasi real-time," or similar terms (as understood by one of ordinary skill in the art), means that an action and a response are temporally proximate such that an individual perceives the action and the response occurring substantially simultaneously. For example, the time difference for a response to display (or for an initiation of a display) of data following the individual's action to access the data may be less than 1 ms, less than 1 sec., less than 5 secs., etc. While the requested data need not be displayed (or initiated for display) instantaneously, it is displayed (or initiated for display) without any intentional delay, taking into account processing limitations of a described computing system and time required to, for example, gather, accurately measure, analyze, process, store, or transmit the data.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, for example, a central processing unit (CPU), an FPGA (field programmable gate array), or an ASIC (application-specific integrated circuit). In some implementations, the data processing apparatus or special purpose logic circuitry (or a combination of the data processing apparatus or special purpose logic circuitry) may be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, IOS, or any other suitable conventional operating system.

A computer program, which may also be referred to or described as a program, software, a software application, a module, a software module, a script, or code can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, for example, one or more scripts stored in a markup language document, in a single file dedicated to the program in question, or in multiple coordinated files, for example, files that store one or more modules, sub-programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components as appropriate. Thresholds used to make computational determinations can be statically, dynamically, or both statically and dynamically determined.

The methods, processes, logic flows, etc. described in this specification can be performed by one or more programmable computers executing one or more computer programs to perform functions by operating on input data and generating output. The methods, processes, logic flows, etc. can also be performed by, and apparatus can also be implemented as, special purpose logic circuitry, for example, a CPU, an FPGA, or an ASIC.

Computers suitable for the execution of a computer program can be based on general or special purpose microprocessors, both, or any other kind of CPU. Generally, a CPU will receive instructions and data from a read-only memory (ROM) or a random access memory (RAM), or both. The essential elements of a computer are a CPU, for performing or executing instructions, and one or more memory devices for storing instructions and data. Generally, a computer will also include, or be operatively coupled to, receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a global positioning system (GPS) receiver, or a portable storage device, for example, a universal serial bus (USB) flash drive, to name just a few.

Computer-readable media (transitory or non-transitory, as appropriate) suitable for storing computer program instructions and data include all forms of non-volatile memory, media and memory devices, including by way of example semiconductor memory devices, for example, erasable programmable read-only memory (EPROM), electrically erasable programmable read-only memory (EEPROM), and flash memory devices; magnetic disks, for example, internal hard disks or removable disks; magneto-optical disks; and CD-ROM, DVD+/−R, DVD-RAM, and DVD-ROM disks. The memory may store various objects or data, including caches, classes, frameworks, applications, backup data, jobs, web pages, web page templates, database tables, repositories storing dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, for example, a CRT (cathode ray tube), LCD (liquid crystal display), LED (Light Emitting Diode), or plasma monitor, for displaying information to the user and a keyboard and a pointing device, for example, a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons. These and other UI elements may be related to or represent the functions of the web browser.

Implementations of the subject matter described in this specification can be implemented in a computing system that includes a back-end component, for example, as a data server, or that includes a middleware component, for example, an application server, or that includes a front-end component, for example, a client computer having a graphical user interface or a Web browser through which a user can interact with an implementation of the subject matter described in this specification, or any combination of one or more such back-end, middleware, or front-end components. The components of the system can be interconnected by any form or medium of wireline or wireless digital data communication (or a combination of data communication), for example, a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) using, for example, 802.11 a/b/g/n or 802.20 (or a combination of 802.11x and 802.20 or other protocols consistent with this disclosure), all or a portion of the Internet, or any other communication system or systems at one or more locations (or a combination of communication networks). The network may communicate with, for example, Internet Protocol (IP) packets, Frame Relay frames, Asynchronous Transfer Mode (ATM) cells, voice, video, data, or other suitable information (or a combination of communication types) between network addresses.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the implementations described above should not be understood as requiring such separation or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

Furthermore, any claimed implementation below is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

What is claimed is:

1. A computer-implemented method, comprising:
   registering a Service Broker with a controller, wherein the Service Broker is used for static Service Instance binding;
   registering an Instance Manager Broker with the controller, wherein the Instance Manager Broker is used for dynamic Service Instance binding;
   receiving, by the controller, a request from a Deployer associated with an Application to bind a Service Instance of an Instance Manager to the Application;
   forwarding, by the controller, the received request to the Instance Manager Broker to instantiate the Service Instance of the Instance Manager; and
   forwarding credentials returned by the Instance Manager Broker from the instantiated Service Instance of the Instance Manager to the Deployer.

2. The computer-implemented method of claim 1, comprising registering the Service Broker with the Instance Manager.

3. The computer-implemented method of claim 1, comprising:
   instantiating the Service Instance of the Instance Manager with the Instance Manager Broker;
   returning credentials associated with the Service Instance of the Instance Manager to the Instance Manager Broker; and
   returning credentials from the Instance Manager Broker to the Deployer.

4. The computer-implemented method of claim 1, comprising passing the returned credentials from the Deployer to the Application to bind the Application to the Service Instance of the Instance Manager.

5. The computer-implemented method of claim 1, comprising the Application requesting Service Instances of available Services and credentials associated with the Service Instances of the available Services from the Service Instance of the Instance Manager.

6. The computer-implemented method of claim 5, comprising:
   sending a request from the Application to the Service Instance of the Instance Manager to instantiate a particular Service Instance of a Service; and forwarding the request from the Application from the Service Instance of the Instance Manager to the Service Broker.

7. The computer-implemented method of claim 6, comprising:
instantiating the particular Service Instance of the Service with the Service Broker; and
accessing the instantiated Service Instance of the Service with the Application using the credentials associated with the Service Instances of the available Services.

8. A non-transitory, computer-readable medium storing one or more instructions executable by a computer system to perform operations comprising:
registering a Service Broker with a controller, wherein the Service Broker is used for static Service Instance binding;
registering an Instance Manager Broker with the controller, wherein the Instance Manager Broker is used for dynamic Service Instance binding;
receiving, by the controller, a request from a Deployer associated with an Application to bind a Service Instance of an Instance Manager to the Application;
forwarding, by the controller, the received request to the Instance Manager Broker to instantiate the Service Instance of the Instance Manager; and
forwarding credentials returned by the Instance Manager Broker from the instantiated Service Instance of the Instance Manager to the Deployer.

9. The non-transitory, computer-readable medium of claim 8, comprising one or more instructions to register the Service Broker with the Instance Manager.

10. The non-transitory, computer-readable medium of claim 8, comprising one or more instructions to:
instantiate the Service Instance of the Instance Manager with the Instance Manager Broker;
return credentials associated with the Service Instance of the Instance Manager to the Instance Manager Broker; and
return credentials from the Instance Manager Broker to the Deployer.

11. The non-transitory, computer-readable medium of claim 8, comprising one or more instructions to pass the returned credentials from the Deployer to the Application to bind the Application to the Service Instance of the Instance Manager.

12. The non-transitory, computer-readable medium of claim 8, comprising one or more instructions to request, by the Application, Service Instances of available Services and credentials associated with the Service Instances of the available Services from the Service Instance of the Instance Manager.

13. The non-transitory, computer-readable medium of claim 12, comprising one or more instructions to:
send a request from the Application to the Service Instance of the Instance Manager to instantiate a particular Service Instance of a Service; and
forward the request from the Application from the Service Instance of the Instance Manager to the Service Broker.

14. The non-transitory, computer-readable medium of claim 13, comprising one or more instructions to:
instantiate the particular Service Instance of the Service with the Service Broker; and
access the instantiated Service Instance of the Service with the Application using the credentials associated with the Service Instances of the available Services.

15. A computer-implemented system, comprising:
a computer memory; and
a hardware processor interoperably coupled with the computer memory and configured to perform operations comprising:
registering a Service Broker with a controller, wherein the Service Broker is used for static Service Instance binding;
registering an Instance Manager Broker with the controller, wherein the Instance Manager Broker is used for dynamic Service Instance binding;
receiving, by the controller, a request from a Deployer associated with an Application to bind a Service Instance of an Instance Manager to the Application;
forwarding, by the controller, the received request to the Instance Manager Broker to instantiate the Service Instance of the Instance Manager; and
forwarding credentials returned by the Instance Manager Broker from the instantiated Service Instance of the Instance Manager to the Deployer.

16. The computer-implemented system of claim 15, further configured to register the Service Broker with the Instance Manager.

17. The computer-implemented system of claim 15, further configured to:
instantiate the Service Instance of the Instance Manager with the Instance Manager Broker;
return credentials associated with the Service Instance of the Instance Manager to the Instance Manager Broker; and
return credentials from the Instance Manager Broker to the Deployer.

18. The computer-implemented system of claim 15, further configured to pass the returned credentials from the Deployer to the Application to bind the Application to the Service Instance of the Instance Manager.

19. The computer-implemented system of claim 15, further configured to request, by the Application, Service Instances of available Services and credentials associated with the Service Instances of the available Services from the Service Instance of the Instance Manager.

20. The computer-implemented system of claim 19, further configured to:
send a request from the Application to the Service Instance of the Instance Manager to instantiate a particular Service Instance of a Service;
forward the request from the Application from the Service Instance of the Instance Manager to the Service Broker;
instantiate the particular Service Instance of the Service with the Service Broker; and
access the instantiated Service Instance of the Service with the Application using the credentials associated with the Service Instances of the available Services.

* * * * *